United States Patent [19]
Lee et al.

[11] Patent Number: 5,253,114
[45] Date of Patent: Oct. 12, 1993

[54] ZOOM LENS SYSTEM

[75] Inventors: Hung-Te Lee, Taipei; Yi-Yen Laio, Hsinchu, both of Taiwan

[73] Assignee: Industrial Technology Research Institute, Chutung, Taiwan

[21] Appl. No.: 15,399

[22] Filed: Feb. 9, 1993

[51] Int. Cl.$^5$ ............................................. G02B 15/14
[52] U.S. Cl. ................................... 359/689; 359/748
[58] Field of Search ................ 359/689, 676, 748, 683

[56] References Cited

U.S. PATENT DOCUMENTS

| | | | |
|---|---|---|---|
| 5,042,926 | 8/1991 | Kikuchi | 359/689 |
| 5,062,695 | 11/1991 | Iwasaki | 359/689 |
| 5,182,673 | 1/1993 | Kikuchi et al. | 359/689 |
| 5,204,780 | 4/1993 | Sakamoto | 359/689 |
| 5,216,547 | 6/1993 | Ogata | 359/689 |

Primary Examiner—Martin Lerner
Assistant Examiner—Evelyn A. Lester
Attorney, Agent, or Firm—W. Wayne Liauh

[57] ABSTRACT

A zoom lens system is arranged in three lens groups, in the order from object side to image plane side, that the first lens group has negative refractive power, the second lens group has positive refractive power, and the third lens group has negative refractive power. During zooming operation from wide angle position to telephoto position, the three lens groups vary the separations therebetween and together move toward the object side of the lens system. The first lens group of the lens system is composed of a negative lens element and a positive lens element.

3 Claims, 4 Drawing Sheets

ZOOM LENS SYSTEM

BACKGROUND OF THE INVENTION

The present invention relates to a zoom lens system, and more particularly to a compact zoom lens system consisting of a negative first lens group, a positive second lens group, and a negative third lens group. The lens system has advantages of compact lens composition and good image quality.

Generally, the zoom lens system is classified into two categories. The first category is so-called retrofocus type zoom lens system, which typically consists of a front lens group having negative refractive power and a rear lens group having positive refractive power. A separation is reserved between the front lens group and the rear lens group, and it is possible to vary the separation to vary the focal length of the lens system. The second category of the zoom lens system is telephoto type zoom lens system which typically consists of a front lens group having positive refractive power and a rear lens group having negative refractive power. A separation is also reserved between the front lens group and the rear lens group for zooming operation.

In the well-known compact zoom lens system nowadays, it is intended to shorten the back focal length so as to compact the zoom lens system. It is noted that the zoom lens system used in this field is typically composed of a first lens group with positive refractive power and a second lens group with negative refractive power. In such an arrangement, it is possible to shorten the total length of the lens system.

However, in the prior art, the aperture diaphram of the lens system is mostly designed in the first lens group. During zooming operation in telephoto position mode, the F number (F#) of the lens system will be increased according to the increase of the focal length of the lens system. As a result, the lens system of prior art is only suitable to be used in bright circumstances.

To overcome the problems of the prior art, a three lens groups type zoom lens system was developed in this field. For example, Japanese Laid Open Patent No. Sho 63-25613 disclosed a compact zoom lens system consisting of three lens groups. It is found that the first lens group of the prior art Japanese Patent is fixed, so that the zooming ratio of which is restricted. U.S. Pat. No. 4,983,027 also disclosed a zoom lens system consisting of three lens groups. However, the first lens group of this prior U.S. patent is designed to have a feature of positive refractive power, which results the zoom lens system in worse chromatic quality when operated at wide angle position.

SUMMARY OF THE INVENTION

In view of the drawbacks of the prior art, the primary object of the present invention is to provide an improved zoom lens system consisting of three lens groups. In the order from the object side to the image plane side of the lens system, the first lens group has a negative refractive power, the second lens group has a positive refractive power, and the third lens group has a negative refractive power. During zooming operation, the three lens groups move toward the object side of the lens system, and at the same time the separations therebetween are varied to effect zooming.

The other object of the present invention is to provide a zoom lens system having advantages of compact lens composition and better chromatic quality. In the preferred embodiment of the present invention, the first lens group is composed of a negative first lens element and a positive second lens element in sequence counting from the object side to the image plane side of the lens system.

The other objects and features of the invention will become more apparent from the following description taken in connection with the accompanying drawings.

DETAILED DESCRIPTION OF THE INVENTION

Figure 1:
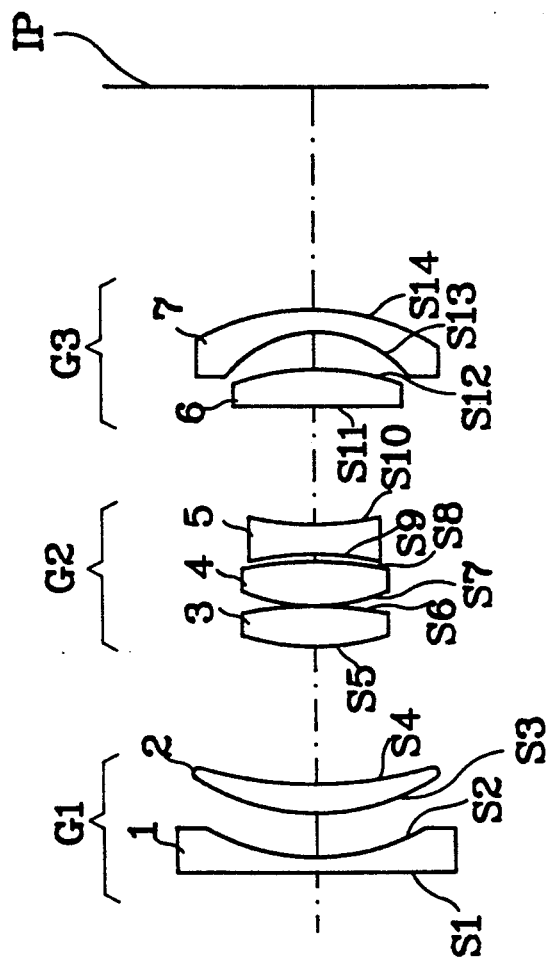
FIG. 1 is a schematic view of a zoom lens composition in accordance with the present invention.

Referring now to FIG. 1, it shows a schematic view illustrating a zoom lens composition in accordance with the preferred embodiment of the present invention. In the order from the object side to the image side IP, the lens composition of the present invention consists of three lens groups G1, G2, and G3. The first lens group G1 is composed of a first lens element 1 and a second lens element 2; the second lens groups G2 is composed of a third lens element 3, a fourth lens element 4, and a fifth lens element 5; the third lens group G3 is composed of a sixth element 6 and a seventh lens element 7.

Counting from the object side of the lens composition, the reference symbols in FIG. 1 are defined as follows:

S1, S2 represent the opposite surface numbers of the first lens element 1 respectively;

S3, S4 represent the opposite surface number of the second lens element 2 respectively;

S5, S6 represent the opposite surface number of the third lens element 3 respectively;

S7, S8 represent the opposite surface number of the fourth lens element 4 respectively;

S9, S10 represent the opposite surface number of the fifth lens element 5 respectively;

S11, S12 represents the opposite surface number of the sixth lens element 6 respectively;

S13, S14 represent the opposite surface number of the seventh lens element 7 respectively; and IP represents the image plane of the lens system.

In the lens composition of the present invention shown in FIG. 1, the first lens froup G1 has a feature of negative refractive power, the second lens group G2 has a feature of positive refractive power, and the third lens group G3 has a feature of negative refractive power.

Figure 2A:
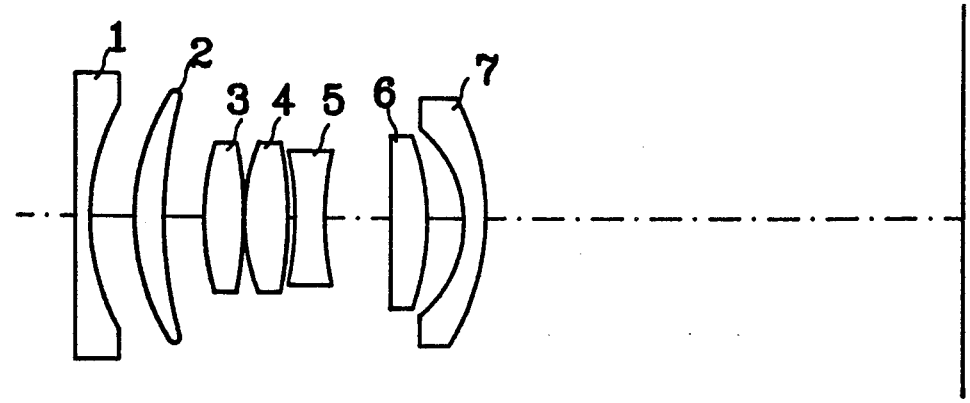
FIG. 2A is a longitudinal sectional view of a zoom lens system shown in FIG. 1 in telephoto position.
Figure 2B:
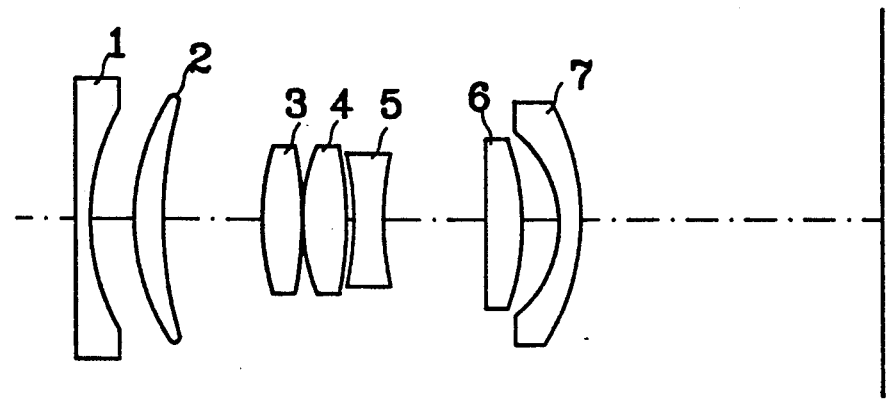
FIG. 2B is a longitudinal sectional view of a zoom lens system shown in FIG. 1 in middle position.
Figure 2C:
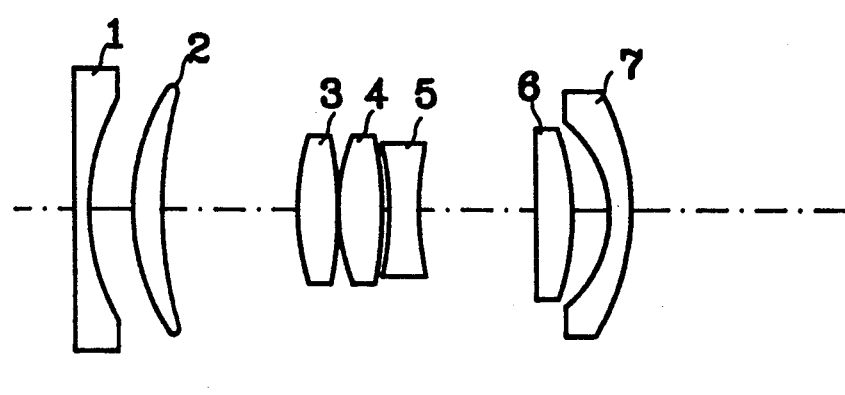
FIG. 2C is a longitudinal sectional view of a zoom lens system shown in FIG. 1 in wide angle position.

FIGS. 2A, 2B, and 2C show the longitudinal sectional view of the zoom lens system of the first embodiment of the present invention in telephoto position, middle position, and wide angle position respectively. In zooming operation from the wide angle position as shown in FIG. 2C to the telephoto position as shown in FIG. 2A, the first lens group G1, the second lens group G2, and the third lens group G3 together move to the object side (left side) of the lens system and the separations between the respective lens group are decreased, so as to conduct the zooming operation of the lens system.

The zoom lens system of the present invention is designed to satisfy the following conditions:

$$1 < |f3|/|f1| < 4.8 \quad (1)$$

$$1 < |f1|/|fw| < 1.5 \quad (2)$$

$$0.9 < \beta_{3T}/\beta_{3W} < 1.7 \quad (3)$$

where
$\beta_{3T}$ represents the magnification of the third lens group G3 at wide angle position
$\beta_{3W}$ represents the magnification of the third lens group G3 at telephoto position
f1 represents the focal length of the first lens group
f3 represents the focal length of the third lens group
fw represents the focal length of the lens system at wide angle position As mentioned above, the second lens group G2 has a feature of positive refractive power. In front of the second lens group G2, there is arranged a first lens group G1 having negative refractive power. In such an arrangement, the separation between the first lens group G1 and the second lens group G2 is varied during adjusting the focal length of the lens system. So, the entrance pupil of the lens system may be changed and the F number of the lens system may be decreased at telephoto position.

It is noted although there is a separation between the first lens group G1 and the second lens group G2 at wide angle position, the first lens group G1 does not need a large outer diameter because the first lens group G1 has a feature of negative refractive power. In addition, the second lens group G2 and the third lens group G3 form a lens system having positive refractive power, which further forms a retrofocus type lens system in combination with the negative first lens group G1. It is known that the retrofocus type lens system is particularly suitable to be used in application of wide angle lens.

At telephoto position, the second lens group G2 is moved to the first lens group G1, forming a lens system having a feature of positive refractive power. The lens system formed by the second lens group G2 and the first lens group G1 further forms a telephoto type lens system in combination with the third lens group G3. The telephoto type lens system is suitable to be used in application of telephoto lens system, and may meet the compact requirement.

During the zooming operation of the lens system of the present invention from wide angle position to the telephoto position, the third lens group G3 of which is moved to the object side in a manner of fast movement so as to vary the lateral magnification of the lens system. Therefore, the magnification of the whole lens system of the present invention may be increased.

According to the conditions described above, it is noted that the condition (1) determines the refractive power between the first lens group G1 and the third lens group G3. In case that the upper limit of the condition (1) is exceeded, the F number of the lens system may be decreased; however, the total length of the lens system is long, making it impossible to make the zoom lens system compact. In case that the lower limit of the condition (1) is exceeded, the total length of the zoom lens system will be shortened, but the F number will be enlarged at telephoto position.

The condition (2) above is used to determine the effective ranges of the refractive power of the first lens group G1. In case that the upper limit of the condition (2) is exceeded, the F number F# of the lens system may be increased at telephoto position, making the meaningless of using the negative first lens group. Besides, the compound refractive power of the first lens group G1 and the second lens group G2 will be increased. As a result, the movement of the third lens group G3 must be increased so as to enlarge the magnification of the third lens group G3. On the contrary, in case that the lower limit of the condition (2) is exceeded, the separation between the second lens group G2 and the third lens group G3 will be increased at wide angle position, resulting the third lens group G3 in larger outer diameter.

The condition (3) above is used to determine the lateral magnification of the third lens group G3. In case that the upper limit of the condition (3) is exceeded, the magnification of the third lens group G3 will be too large, resulting the movement of the third lens group G3 in increase. On the contrary, in case that the lower limit of the condition (3) is exceeded, the magnification of the second lens group G2 must be increased, and therefore the separation between the 10 second lens group G2 and the third lens group G3 must be increased. As a result, it is difficult to shorten the total length of the zoom lens.

To compact the lens composition and provide good image quality of the lens system, the first lens group G1 in accordance with the present invention, in the order from the object side to the image plane side, is composed of a negative first lens element 1 and a positive second lens element 2. In such an arrangement, the first lens group should be designed to satisfy the following condition:

$$Vin - Vip > 20 \quad (4)$$

where the Vin represents the Abbe's number of the negative first lens element 1 and the Vip represents the Abbe's number of the positive second lens element 2.

On the contrary, in case that the first lens group G1 is composed of a positive lens element and a negative lens element the principal plane of the first lens group G1 will be positioned closely to the second lens group. As a result, the separation between the first lens group and the second lens group must be increased, and therefore the outer diameter of the first lens group will be larger relatively. Obviously, it will be difficult to compact the zoom lens system.

Consequently, in the zoom lens system of the present invention, the first lens group G1 is composed of a negative lens element and a positive lens element in sequence counting from the object side of the lens system. Unfortunately, in such an arrangement, the transverse chromatic aberration of the lens system will be increased. In order to eliminate the transverse chromatic aberration, the lens system of the present invention is designed to satisfy the condition (4) above so as to make it possible to obtain a good image quality.

The numerical data of preferred embodiments 1 and 2 of the zoom lens system according to the present invention are listed below:

EMBODIMENT 1
f 29–69.7    F No. 4.0–7.7

| i | ri | di | ni | vi |
|---|---|---|---|---|
| 1 | −333.696 | 1.3 | 1.77350 | 49.6 |
| 2 | 16.614 | 3.65 | | |
| 3 | 18.495 | 3.10 | 1.78489 | 26.1 |
| 4 | 29.569 | d4 | | |
| 5 | 18.540 | 3.39 | 1.58229 | 58.3 |
| 6 | −52.180 | 0.24 | | |
| 7 | 16.139 | 3.74 | 1.49947 | 68.4 |
| 8 | −51.039 | 0.5 | | |
| 9 | −29.884 | 1.3 | 1.79669 | 26.6 |
| 10 | 32.730 | d10 | | |
| 11 | −469.109 | 2.84 | 1.68175 | 30.9 |
| 12 | −19.634 | 2.55 | | |
| 13 | −10.088 | 1.3 | 1.77350 | 49.6 |
| 14 | −24.651 | | | |
| f | 28.93 | 43 | 69.71 | |
| d4 | 16.54 | 8.51 | 2.00 | |
| d10 | 10.78 | 9.31 | 8.21 | |

$|f_3|/|f_1| = 4.12$
$|f_1|/|f_w| = 1.15$
$\beta_{3T}/\beta_{3W} = 1.20$
Vin−Vip = 23.5

EMBODIMENT 2
f 28.93–69.79    F No. 4.01–7.75

| i | ri | di | ni | vi |
|---|---|---|---|---|
| 1 | −244.488 | 1.30 | 1.77350 | 49.6 |
| 2 | 17.212 | 3.74 | | |
| 3 | 19.232 | 3.26 | 1.78085 | 26.6 |
| 4 | 32.189 | d4 | | |
| 5 | 17.930 | 3.59 | 1.57153 | 59.3 |
| 6 | −56.466 | 0.1 | | |
| 7 | 17.257 | 3.47 | 1.49295 | 69.5 |
| 8 | −52.954 | 0.5 | | |
| 9 | −30.542 | 1.3 | 1.79138 | 25.9 |
| 10 | 42.349 | d10 | | |
| 11 | 3914.517 | 3.0 | 1.68893 | 30.4 |
| 12 | −20.884 | 2.28 | | |
| 13 | −10.019 | 1.30 | 1.77350 | 49.6 |
| 14 | −29.019 | | | |
| f | 28.93 | 43 | 69.79 | |
| d4 | 16.96 | 8.72 | 2.20 | |
| d10 | 11.87 | 9.82 | 8.76 | |

$|f_3|/|f_1| = 2.45$
$|f_1|/|f_w| = 1.20$
$\beta_{3T}/\beta_{3W} = 1.30$
Vin−Vip = 23.0 where the reference symbol f represents focus length of the lens system, ri represents the radii of curvature of respective lens surfaces, di represents the thicknesses of respective lenses and separations between respective lenses, ni represents the refractive index of respective lenses, and vi represents Abbe's number of respective lenses.

Figure 3:
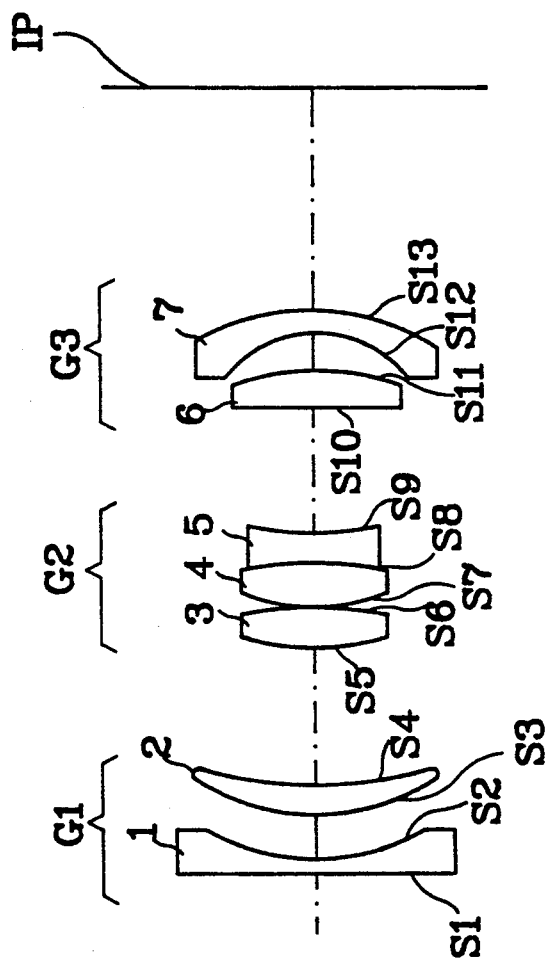
FIG. 3 is a schematic view of a zoom lens composition in accordance with another embodiment of the present invention.
Figure 4A:
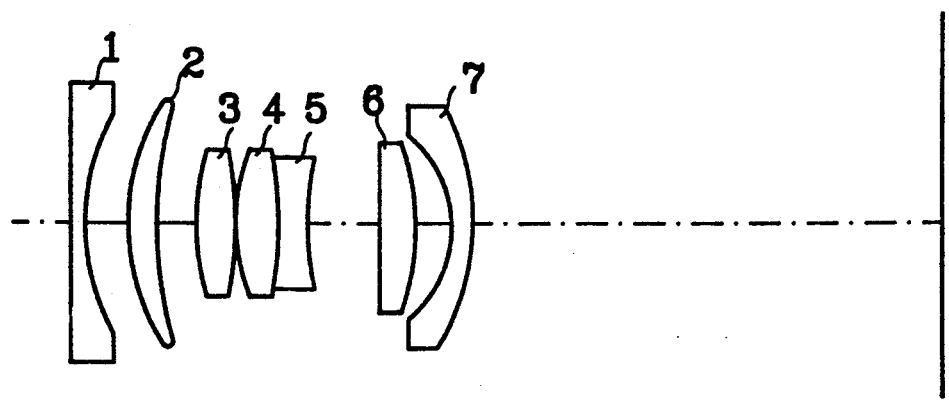
FIG. 4A is a longitudinal sectional view of a zoom lens system according to the embodiment shown in FIG. 3 in telephoto position.
Figure 4B:
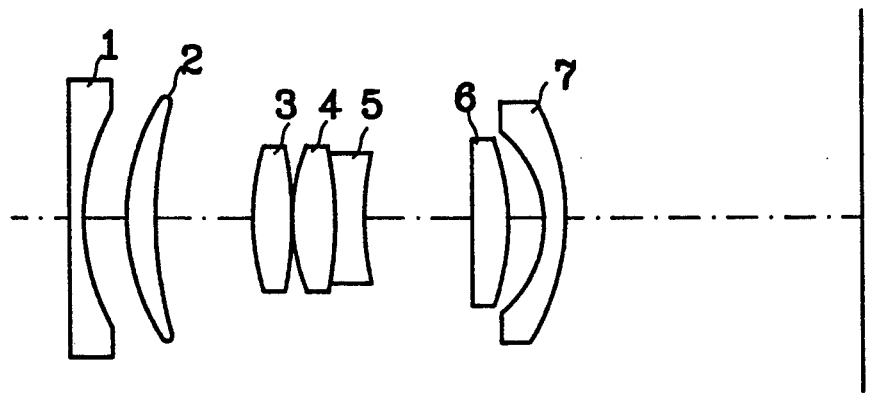
FIG. 4B is a longitudinal sectional view of a zoom lens system according to the embodiment shown in FIG. 3 in middle position.
Figure 4C:
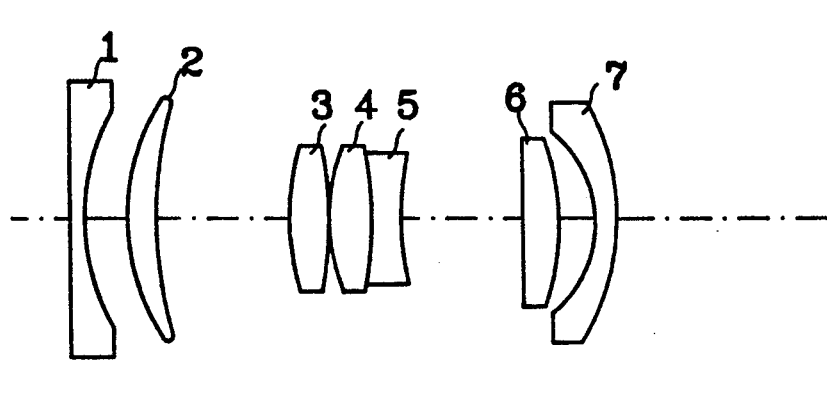
FIG. 4C is a longitudinal sectional view of a zoom lens system according to the embodiment shown in FIG. 3 in wide angle position.

FIG. 3 is the third embodiment of the lens composition of the present invention. The number of lens elements and the arrangement between the lens elements are same to that of the first embodiment as shown in FIG. 1, except that the adjacent surfaces of the fourth lens element 4 and the fifth lens element 5 are adhered. The adhered surface is indicated by a reference symbol S8. Therefore, the reference symbols S8 and S9 represent the opposite surface number of the fifth lens element 5 respectively; the reference symbols S10 and S11 represent the opposite surface number of the sixth lens element 6; the reference symbols S12 and S13 represents the opposite surface number of the seventh lens element 7. FIGS. 4A, 4B, and 4C show the longitudinal sectional view of the zoom lens system of the third embodiment of the present invention in telephoto position, middle position, and wide angle position respectively.

The numerical data of the third embodiment of the present invention is listed below:

EMBODIMENT 3
f 29.05–68.55    F No. 4.0–7.50

| i | ri | di | ni | vi |
|---|---|---|---|---|
| 1 | −757.102 | 1.30 | 1.77350 | 49.6 |
| 2 | 16.743 | 4.10 | | |
| 3 | 19.319 | 3.23 | 1.80500 | 25.5 |
| 4 | 31.356 | d4 | | |
| 5 | 18.582 | 3.79 | 1.49125 | 69.8 |
| 6 | −36.574 | 0.1 | | |
| 7 | 16.488 | 4.16 | 1.59090 | 57.6 |
| 8 | −17.163 | 1.23 | 1.80219 | 34.3 |
| 9 | 26.409 | d9 | | |
| 10 | −66.354 | 2.68 | 1.67475 | 31.3 |
| 11 | −17.168 | 2.89 | | |
| 12 | −9.908 | 1.30 | 1.77350 | 49.6 |
| 13 | −23.275 | | | |
| f | 29.05 | 43.05 | 68.55 | |
| d4 | 17.70 | 8.95 | 2.00 | |
| d9 | 11.30 | 9.82 | 8.67 | |

$|f_3|/|f_1| = 2.58$
$|f_1|/|f_w| = 1.23$
$\beta_{3T}/\beta_{3W} = 1.27$
Vin−Vip = 24.1

The feature of the present invention has been described in detail above. It will be obvious to those skilled in the art to use this invention according to the above detailed description. While the arrangement of the preferred embodiments of this invention, it is to be understood that various changes and modifications may be made therein without departing from the scope and spirit of the invention as defined in the appended claim.

I claim:

1. A zoom lens system is arranged in three lens groups, in the order from object side to image plane side, the first lens group having negative refractive power, the second lens group having positive refractive power and the third lens group having negative refractive power, during zooming operation from wide angle position to telephoto position, the first, second, and third lens groups varying their respective separations and together moving toward the object side of the lens system, the zoom lens system being designed to satisfy the following condition:

$$1 < |f_3|/|f_1| < 4.8$$

$$1 < |f_1|/|f_w| < 1.5$$

$$0.9 < \beta_{3T}/\beta_{3W} < 1.7$$

where the $\beta_{3T}$ represents the magnification of the third lens group at wide angle position; the $\beta_{3W}$ represents the magnification of the third lens group G3 at telephoto position; f1 represents the focal length of the first lens group; the f3 represents the focal length of the third lens group; and the fw represents the focal length of the lens system at wide angle position.

2. A zoom lens system as claimed in claim 1, wherein the first lens group is composed of a negative lens element and a positive lens element in the order from the object side to the image plane side.

3. A zoom lens system as claimed in claim 2, wherein the first lens group is designed to satisfy the following condition:

$$Vin - Vip < 20$$

where the Vin represents Abbe's number of the negative lens element and the Vip represents Abbe's number of the positive lens element of the first lens group.

* * * * *